United States Patent [19]
Van Beugen et al.

[11] Patent Number: 5,477,886
[45] Date of Patent: Dec. 26, 1995

[54] INFLATABLE CLOSING PLUG FOR PIPES AND METHOD OF MANUFACTURING SAME

[75] Inventors: Jochim Van Beugen, Hellevoetsluis; Frederik Govaert, Bolsward, both of Netherlands

[73] Assignee: J. Van Beugen Beheer B.V., Hellevoetsluis, Netherlands

[21] Appl. No.: 186,518

[22] Filed: Jan. 26, 1994

[51] Int. Cl.⁶ ............................ F16L 55/12; B65H 54/64
[52] U.S. Cl. ................... 138/93; 138/89; 156/156; 156/172
[58] Field of Search ............... 138/89, 93; 156/184, 156/156, 166, 169, 172, 175

[56] References Cited

U.S. PATENT DOCUMENTS

| | | | |
|---|---|---|---|
| 628,726 | 7/1899 | Schultz | 138/93 |
| 1,795,848 | 3/1931 | Drees | 138/93 |
| 1,906,151 | 4/1933 | Goodman | 138/93 |
| 2,678,666 | 5/1954 | Theis et al. | 138/93 |
| 3,604,732 | 9/1971 | Malone | 138/93 |
| 3,858,441 | 1/1975 | Comeau | 138/93 |
| 3,898,918 | 8/1975 | Carter | 138/93 |
| 3,946,761 | 3/1976 | Thompson et al. | 138/93 |
| 4,079,755 | 3/1978 | Van der Lans | 156/184 |
| 4,291,727 | 9/1981 | Yie et al. | 138/93 |
| 4,377,184 | 3/1983 | Vetter | 138/93 |
| 4,413,653 | 11/1983 | Carter | 138/89 |
| 4,423,754 | 1/1984 | Carter | 138/93 |
| 4,458,721 | 7/1984 | Yie et al. | 138/89 |
| 4,467,835 | 8/1984 | Champleboux | 138/93 |
| 4,467,836 | 8/1984 | Ragout | 138/89 |
| 4,514,447 | 4/1985 | Boxmeyer | 138/109 |
| 4,526,207 | 7/1985 | Burkley et al. | 138/89 |
| 4,614,206 | 9/1986 | Mathison et al. | 138/89 |
| 4,883,094 | 11/1989 | Vetter | 138/89 |
| 5,032,200 | 7/1991 | DiBartola et al. | 156/156 |
| 5,122,400 | 6/1992 | Stewart | 156/156 |

FOREIGN PATENT DOCUMENTS

| | | | |
|---|---|---|---|
| 0543458 | 5/1983 | European Pat. Off. . | |
| 1245254 | 9/1971 | United Kingdom | 138/93 |
| 1435352 | 5/1976 | United Kingdom . | |
| 2099541 | 12/1982 | United Kingdom . | |

Primary Examiner—James E. Bryant, III
Attorney, Agent, or Firm—Banner & Allegretti, Ltd.

[57] ABSTRACT

An inflatable closing plug for pipes and a method of manufacturing same. The plug includes a unitary balloon-like element of elastic material, and a wire located on and adhered to the outer surface of the balloon-like element. The wire extends from the first end of the balloon-like element to the second end of the balloon-like element, and has a coefficient of elasticity which is less than the coefficient of elasticity of the elastic material of the balloon-like element. The plug can expand freely in the radial direction and is bounded in axial sense by the longitudinal wire or wires, in order to permit a sufficient closing pressure to be achieved. To manufacture the plug the balloon-like element is inflated to a predetermined pressure. At least one wire is placed on the outer surface of the inflated balloon-like element between its two ends, and adhered thereto.

20 Claims, 6 Drawing Sheets

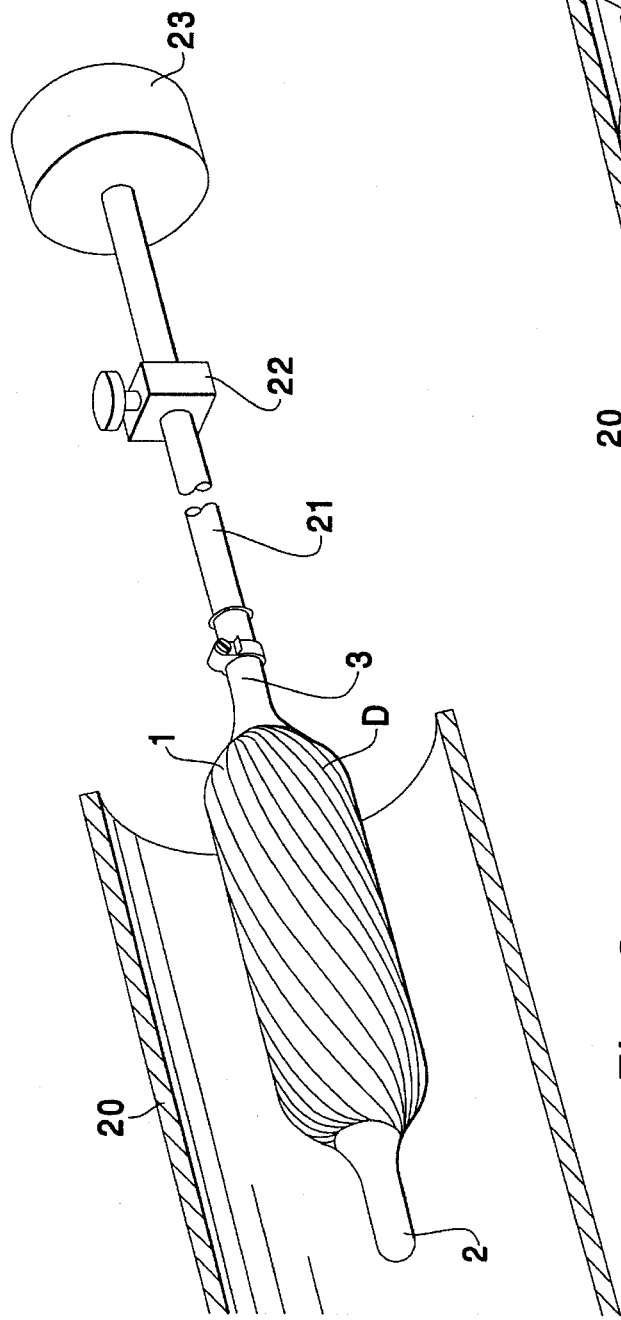
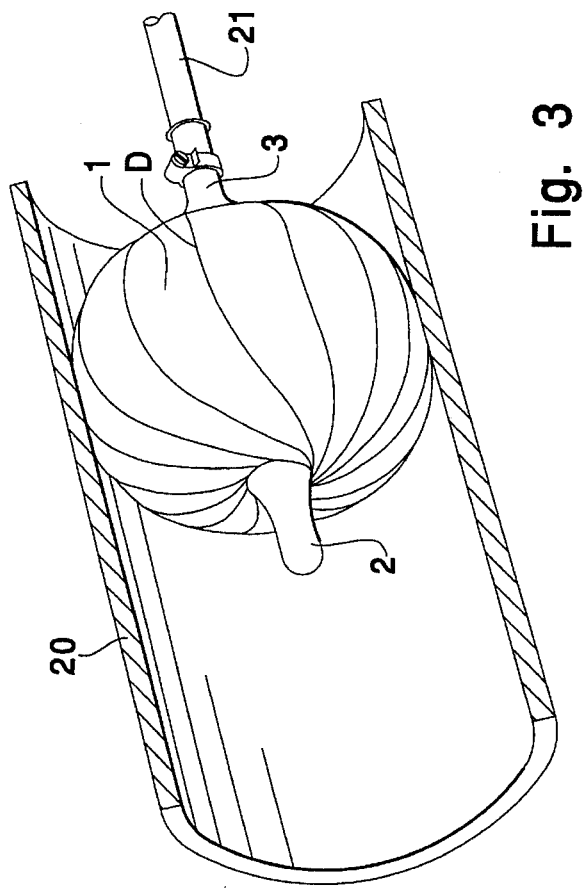
Fig. 2
Fig. 3

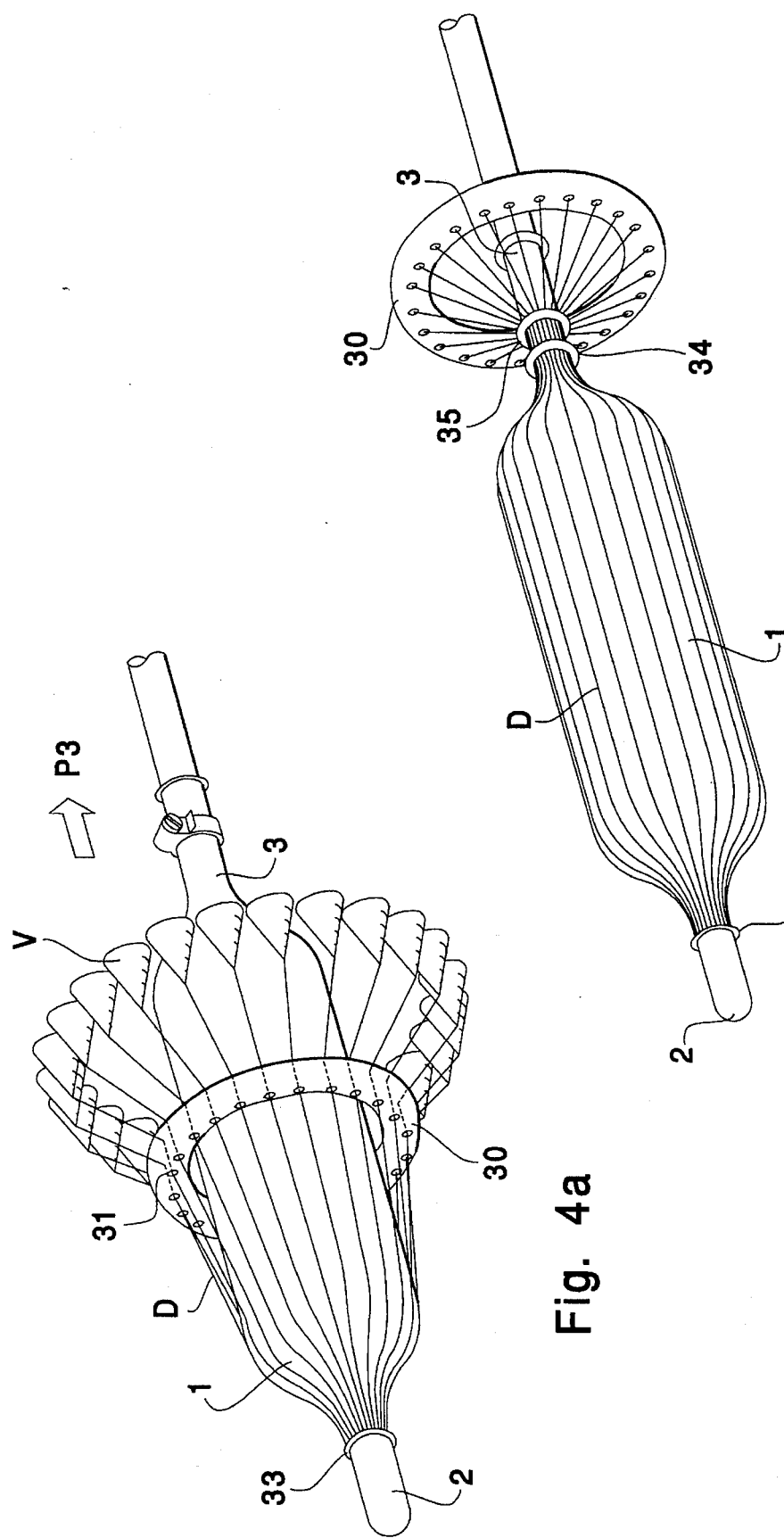

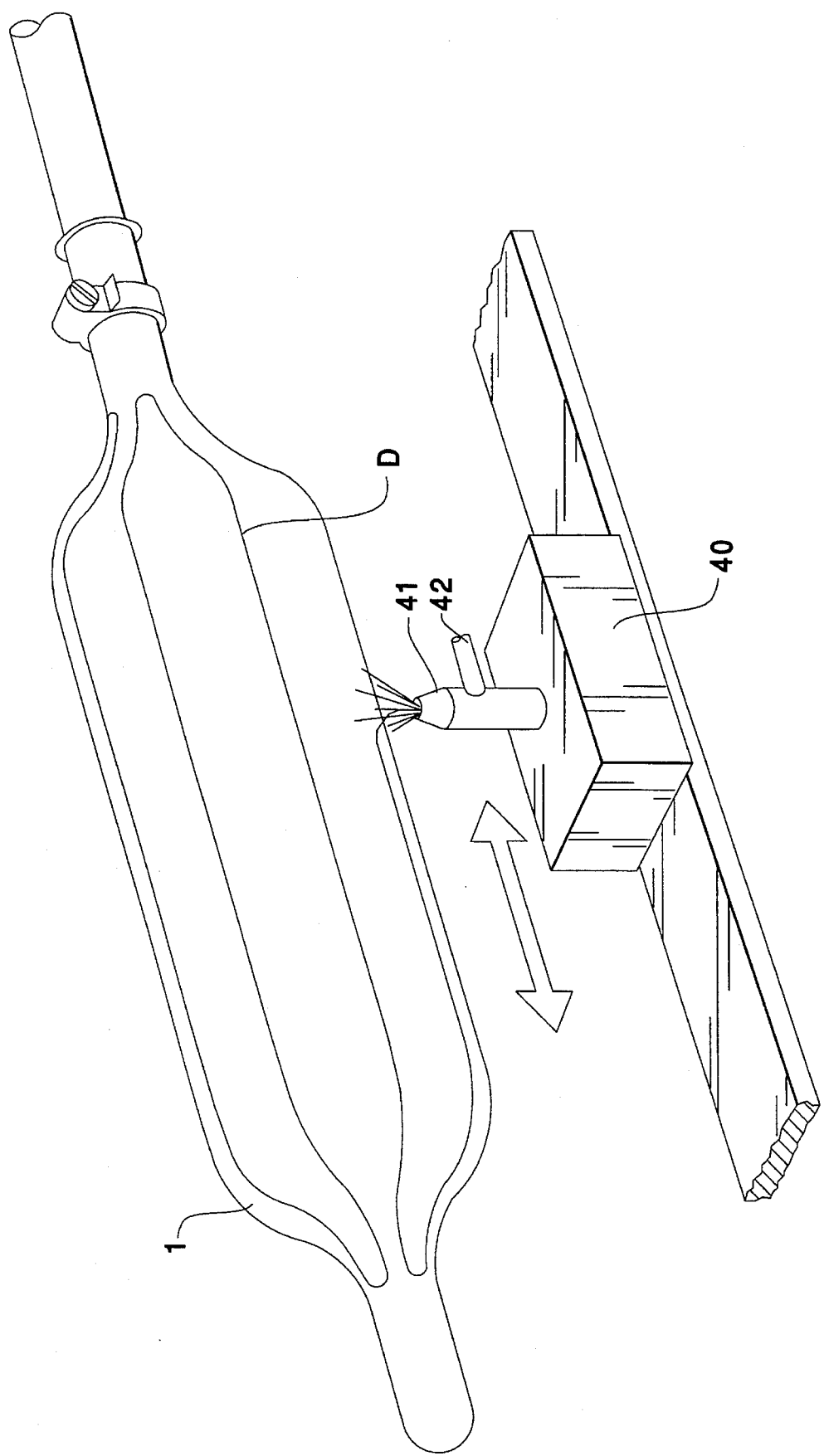

INFLATABLE CLOSING PLUG FOR PIPES AND METHOD OF MANUFACTURING SAME

BACKGROUND OF THE INVENTION

The invention relates to a method for manufacturing an inflatable closing plug for pipes, which plug comprises a balloon-like element of elastic material.

Such plugs are used for closing pipes, for instance gas pipes, and are inserted beforehand in an opening of the gas pipe, whereafter the balloon-like element is placed under pressure by means of compressed air or the like so that the balloon widens and closes the passage of the pipe. In order that the balloon is able to exert any pressure on the inner wall of the gas pipe, the balloon must have limited freedom of movement, whereby a separate sheath of woven material is arranged round the balloon. This separate sheath has a limited elasticity so that, when the balloon is inflated, it cannot extend in axial sense of the pipe and the pressure of the gaseous medium in the balloon is applied against the inner wall of the pipe so that an adequate closing pressure can be obtained.

Manufacture of a balloon with a separate sheath therearound is quite time-consuming and moreover has the limitation that the variation in diameters of the pipes for closing must be limited, whereby balloons with different nominal working diameters must be used and held in stock.

Plugs are already known wherein the balloon-like element is provided with reinforcement wires in the outer surface thereof, which wires are anchored in end pieces. The manner of manufacturing such a balloon-like element is likewise time-consuming and costly.

SUMMARY OF THE INVENTION

The invention has for its object to obviate the above stated drawbacks and to provide a method wherewith a plug consisting of a balloon-like element can be made in simple and inexpensive manner.

The method according to the invention is distinguished in that the balloon-like element is inflated to a predetermined pressure,

- a wire or a group of wires with low elasticity is placed from the one end to the other of the balloon, and

- the wire or wires is or are adhered to the surface of the balloon.

Due to the wires with low elasticity which extend substantially in axial direction of the balloon-like element, a stretching of the balloon in axial direction after inflation to the nominal working pressure is limited and the balloon will only stretch in radial sense until the balloon presses against the inner wall of the pipe. It is therefore no longer necessary to arrange a separate sheath. The balloon can moreover stretch in radial direction over a much greater variation of diameters so that much fewer balloon sizes are required.

According to a further development of the method of the invention, the wire is drawn from a supply and wound round the balloon ends, wherein the balloon-like element is rotated on the longitudinal axis thereof. Subject to the rotation step, a large number of wire parts extending from the one end to the other can thus be arranged on the balloon surface, whereafter adhesion can take place.

In the preferred embodiment a latex material is sprayed onto the surface of the balloon-like element after arranging of the wires on the surface so that the wires can therewith be intimately adhered to the surface.

According to a variant of the method it is also possible to spray the wire onto the surface simultaneously with the latex.

It is further possible to spin the wires from fibres prior to spraying, adhere them with the latex and subsequently arrange them on the surface.

Prior to arranging of the wires the surface of the balloon-like element can be coated with an adhesive layer.

The invention further relates to the balloon obtained according to the above described method, wherein the balloon-like element consists of elastic material, for instance rubber. The arranged reinforcement wires may consist of steel wire, glass or carbon fibre, which fibres can be spun beforehand to wires.

In such a balloon-like element the invention further suggests to improve a guiding shaft arranged in the balloon to guide the balloon from the deflated unto the inflated position and vice versa. According to the invention said guiding shaft is telescopically.

Above mentioned method and other features of the invention will be further elucidated hereinbelow in a number of embodiments, which are shown in the annexed drawings.

BRIEF DESCRIPTION OF THE DRAWINGS

FIG. 2 and 3 show perspective views of the obtained closing plug in respectively deflated and inflated state in a pipe-shaped element, FIG. 4a and b show in each case a perspective view of another manner of intimately placing reinforcement wires round a balloon-like element, respectively in partial and completed state, FIG. 5 is a perspective view of a balloon-like element wherein the reinforcement wires are placed intimately in accordance with another variant of the method, FIG. 6a–6b, each is a perspective view of a balloon-like element according to the invention provided with a guiding shaft, having telescopic moving parts.

DESCRIPTION OF THE PREFERRED EMBODIMENTS

Figure 1:
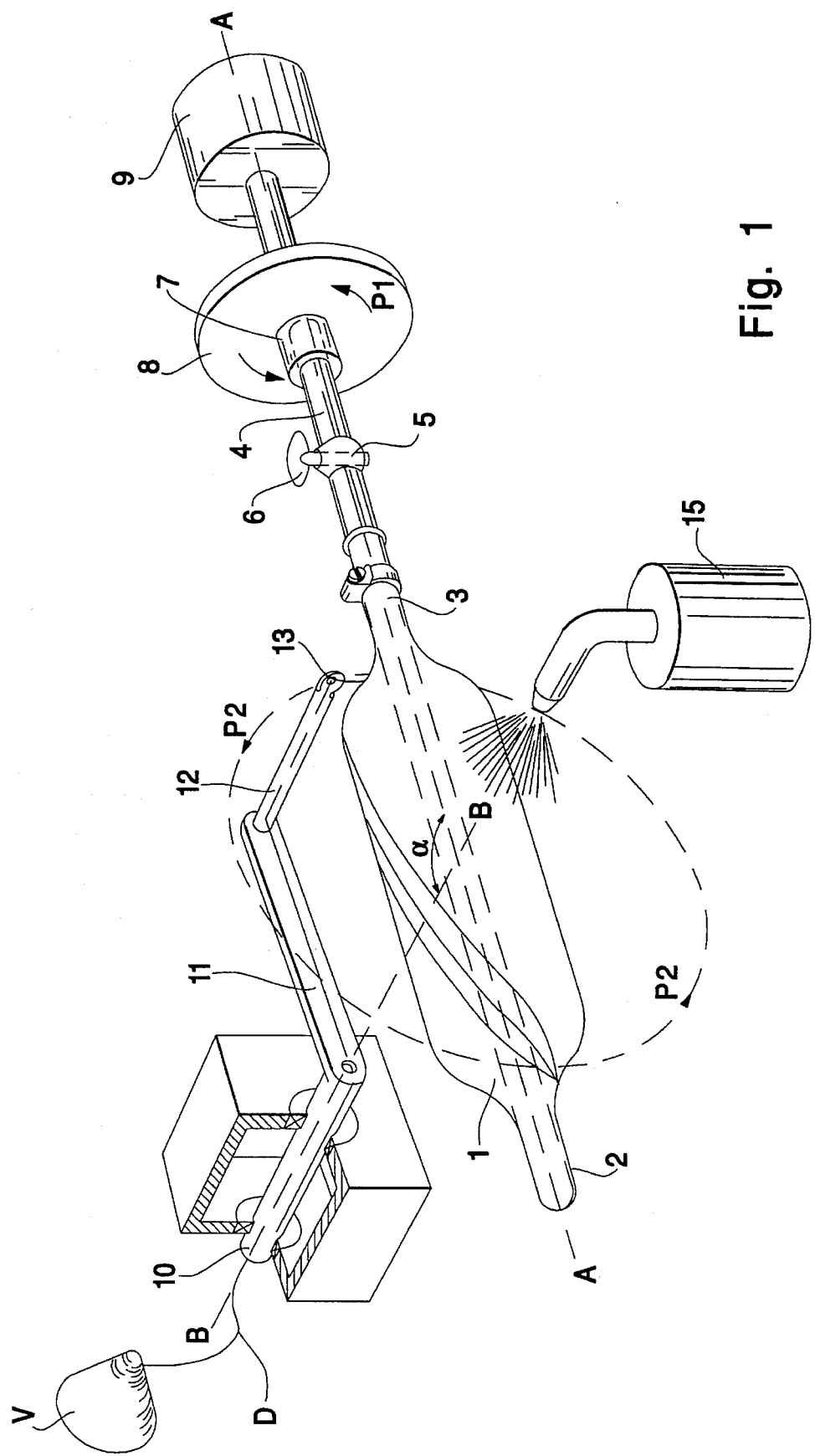
FIG. 1 shows a schematic perspective view of a device for performing the method as according to a first embodiment.

Designated with the numeral 1 in FIG. 1 is the balloon-like element which serves to obtain a closing plug according to the invention. The balloon-like element is closed on one side 2 and connected on the other side 3 to a shaft end part 4 which is provided with a closing valve 5 which can be placed by means of the handle 6 in the open or closed position. The shaft end part 4 can extend wholly through the balloon-like element 1 into the narrowed end portion 2 of the element, although this is not strictly necessary.

The shaft end part 4 is inserted into a sleeve 7 of a rotatably mounted carrier 8 which can be revolved in continuous or stepwise manner in the direction of the arrow P1 by a motor 9.

Arranged at a predetermined angle α in relation to the lengthwise axis A—A of the shaft end part 4 and therefore the balloon-like element 1 is a rotating holder 10 which is driven rotatably via bearings in a frame. At one end the holder 10 has a crank 11 which bears an arm 12 on the free end. The arm 12 has a guide eye 13. By turning the holder 10 about the axis B—B the eye 13 follows a circular path designated with the arrow P2. The centre of this path coincides with the point of intersection of the line B—B and the line A—A. Since the angle α is greater than 90°, the eye 13 will pass close to the carrier 8 on the rear side of the balloon-like element 1 in FIG. 1 and on the side 2 of the balloon-like element on the front side thereof.

A wire D can be unwound from a supply V and be guided outward via an opening in the carrier 10 and via the crank 11 and subsequently along the arm 12 through the eye 13.

When the outer end of wire D is fastened to a surface part of the balloon-like element 1, the wire can be wound from the one end to the other over the outside of the balloon-like element practically parallel to the centre line A—A thereof, wherein the step of motor 9 determines each time the measure of the distance of successive wire parts, since the balloon-like element 1 is rotated stepwise with the shaft end part 4 round the axis A—A.

When winding round the balloon-like element 1 is completed, an adhesive can be sprayed by means of a spray device 15 over the deposited wire parts and the surface of balloon-like element 1 so that an intimate adhesion occurs between the wire parts and balloon-like element 1.

It is noted that, prior to a balloon-like element 1 being arranged in the turning device 8, 9, this balloon-like element 1 is brought to a predetermined pressure by connecting the shaft end part 4 to a pressure source, opening the valve 5, 6, applying the desired pressure in balloon-like element 1 and subsequently closing the valve 5, 6. The balloon-like element thereby acquires some firmness during winding of the wire D.

After completion of the closing plug it can be removed from the shaft stump 4 and be replaced by a new balloon-like element 1.

In FIG. 2 and 3 the manner of application of the obtained closing plug is further elucidated. The plug is connected with the end 3 onto a pressure line 21 which is in communication with a pressure source 23 via a valve 22. The plug is then pushed into a pipe 20 for closing, which can take place in any random manner, for instance via an open end part of pipe 20, but also via an opening to be made in the wall thereof.

By opening valve 22 compressed air is then admitted into the plug or balloon-like element 1, whereby it will stretch in substantially radial sense, which is shown in FIG. 3. Due to the wire parts, which are made of material with little elasticity, the balloon will assume a melon-shaped form, whereby the outer periphery will become larger and touch against the inner wall of the pipe 20. The distance between the free part 2 and the part 3 of the balloon-like element 1 fastened to the line 21 becomes smaller due to the inflation, since the reinforcement wires do not permit an axial lengthening of the balloon, rather they bring about the above stated distance reduction. As a result of this form the possibility is created that the balloon-like element, itself of very elastic material, will nestle firmly against the inner wall of pipe 20 and be able to build up pressure sufficient to resist possible gas pressure on the left-hand side of the plug.

FIG. 4a and b show another method for placing the reinforcement wires according to the invention. For this purpose an annular element 30 with a diameter slightly larger than the outer diameter of the balloon-like element 1 placed under pressure can be pushed along the outer surface in the direction of arrow P3. Within the scope of the invention it is also possible to slide the balloon-like element in the opposite direction through the ring 30. The ring is provided with axially oriented holes 31, a large number of which are distributed over the periphery of the ring. Each hole 31 serves to guide a wire D, which can be drawn from a supply reel V.

All wire ends are initially fastened to an auxiliary ring 33 which connects close-fittingly onto the end 2 of balloon-like element 1.

After the end 3 of balloon-like element 1 has passed through the ring 30, two rings can be clamped round the wire bundle D and fixed thereto by means of a ring applying mechanism (not shown), whereafter the wires between the rings 34, 35 are cut. The balloon-like element can then be removed with the wires D. The wires D can be adhered fixedly to the outer surface of the balloon-like element in the above described manner.

FIG. 5 shows an embodiment wherein the wire D, which is received in fibre form in a supply container 40, is drawn by forming the fibres to a wire with a spray device 41 by means of an adhesive which is carried via feed line 42 into the spray nozzle. With a reciprocating movement of the supply container 40 with spray nozzle 41 along the outer surface of a balloon-like element 1 a wire can be formed each time along the outer surface and adhered by the same adhesive from the spray nozzle 41. The balloon-like element 1 can if desired be clamped in a turning device in the manner shown in FIG. 1 in order to rotate the element a step further at a time during the reciprocating movement of spray nozzle 41.

In all the above described methods for strengthening the balloon-like element with longitudinal wires of material with little elasticity, the surface of the balloon-like element can first be coated with an adhesive such as latex, polyurethane or the like prior to arranging of these wires.

Figure 6A:
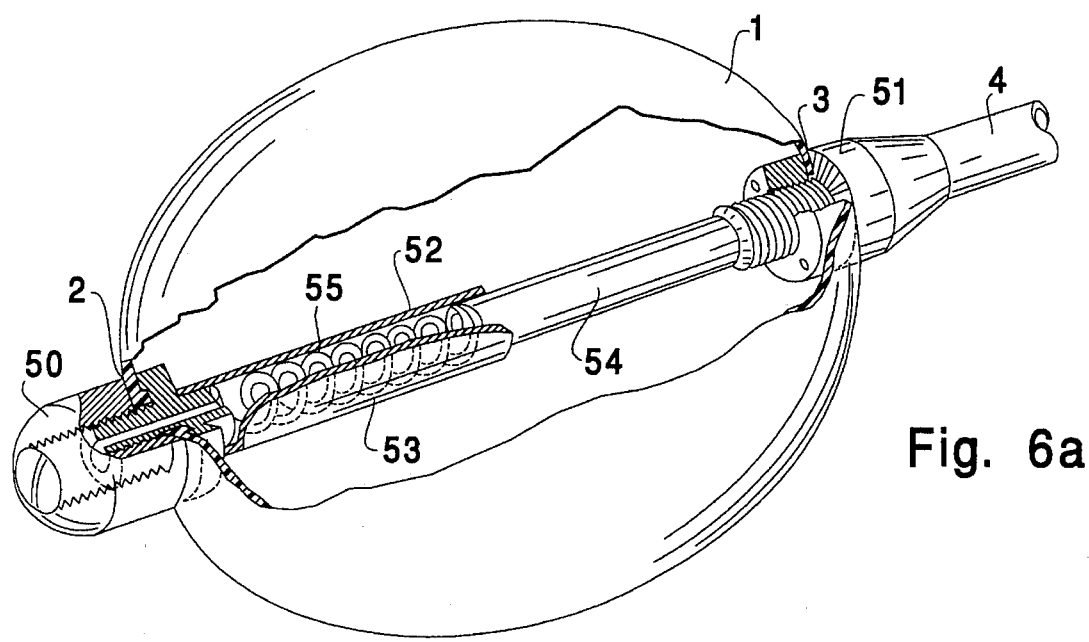
Figure 6B:
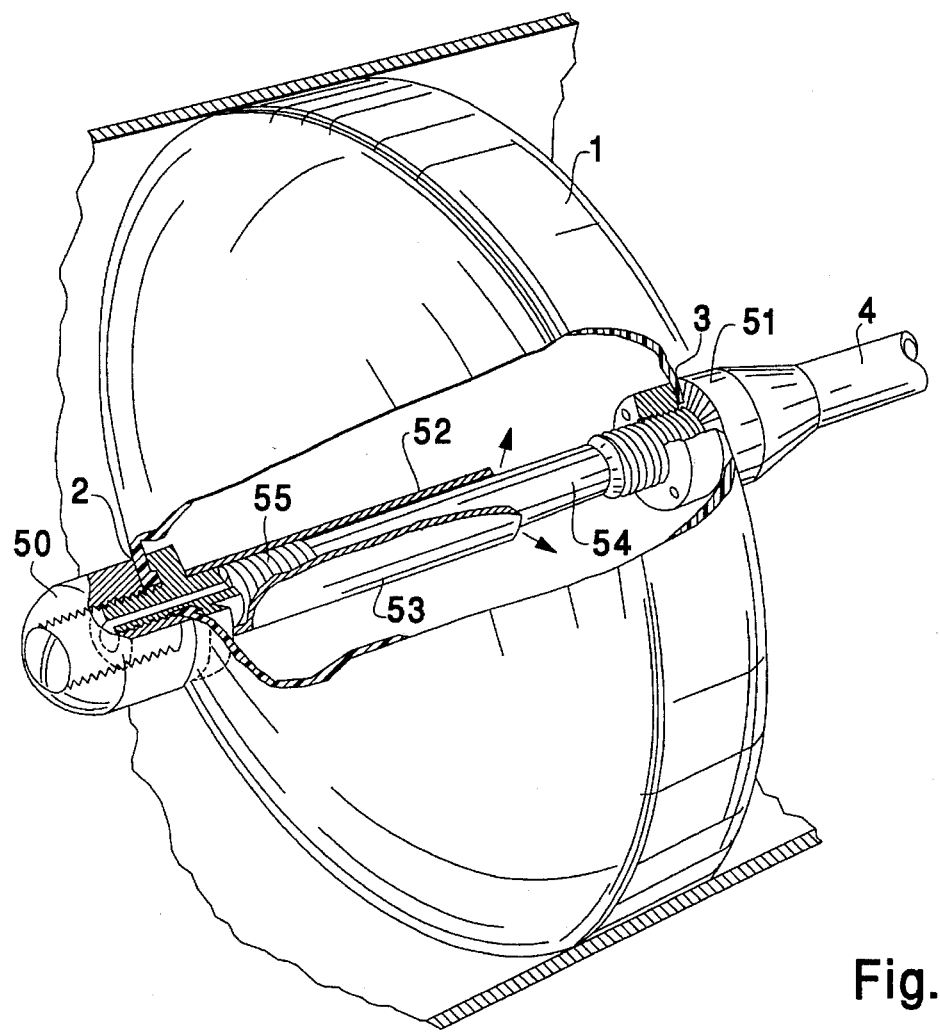
Figure 7:
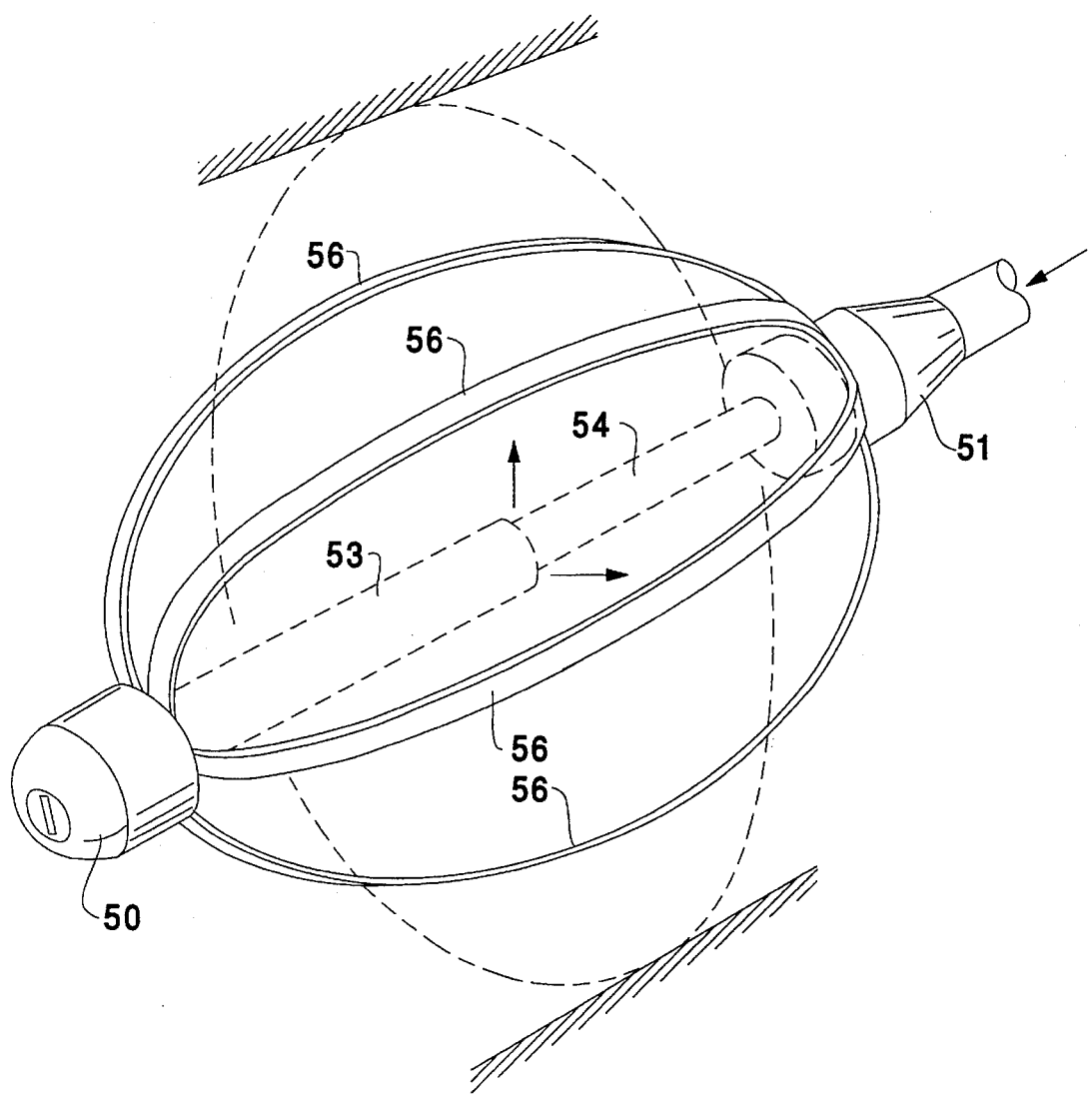
FIG. 7 is a perspective view of a balloon-like element as depicted in FIG. 6 having an alternative guiding shaft.

The FIGS. 6 and 7 both depict a guiding shaft for a balloon-like element as described here above.

As is to see in FIG. 6 the narrowed end portions 2 and 3 of the balloon-like element are cut through and tightly fitted inbetween fitting elements 50, 51, said element 51 being connected to the supply tube 4 as is shown in FIG. 1.

Inbetween both fitting elements 50, 51 a guiding shaft 52 is arranged such that the two fitting elements 50 and 51 are movably guided with respect to each other. Therefore the guiding shaft 52 comprises two parts 53 and 54 telescopically fitting into each other. The part 53 is further provided with a spring means 55, acting upon the outer extremity of part 54, intimately enclosed in part 53 and the end surface of the fitting element 50.

FIG. 6a shows the deflated balloon-like element 1 whereas FIG. 6b shows the inflated balloon. In the deflated position the spring 55 will urge outwardly the two parts 53, 54 of the guiding shaft 52, so urging the fitting elements 50 and 51 apart from each other such that the balloon-like element 1 will be stretched.

When inflating the balloon-like element 1 by a gas, which may be fed through tube 4, being in communication with the two parts 53, 54 of the guiding shaft 52, said gas will inflate the balloon as in the position of FIG. 6b. Due to the inflated balloon, the fitting elements 50, 51 will approach each other against the force of the spring 55, said spring being compressed.

When deflating the balloon, the gas pressure is relieved by tube 4, so the gas can flow out of the balloon-like element, and the fittings 50, 51 will spead from each other due to the spring action 55.

FIG. 7 shows an alternative spring means, wherein the helical spring 55 in the telescopic guiding shaft 52 is replaced by spring strips 56, the outer extremities are clamped in the fitting elements 50, 51. Departing from the position in FIG. 7, wherein the balloon-like element (not shown) is deflated, the spring strips will be forced in a more curved or bended configuration due, to the fact that the fitting elements 50, 51 will be urged to each other in a position as shown in FIG. 6b. The spring strips 56 are bended under increasing counter action of the strips, so when deflating the balloon again said strips will urge the fitting elements 50, 51 apart from each other. The guiding will be provided by the shaft parts 53, 54 as is shown in FIG. 6.

Other embodiments and other combinations of the above described and shown methods are possible within the scope of the invention.

We claim:

1. A method for manufacturing an inflatable closing plug for pipes, said method comprising:
    providing a balloon-like element of elastic material, the balloon-like element having an outer surface and first and second ends;
    inflating the balloon-like dement to a predetermined pressure;
    placing at least one wire having a low coefficient of elasticity from the first end of the inflated balloon-like element to the second end of the balloon-like dement; and
    adhering said at least one wire to the outer surface of the inflated balloon-like element.

2. The method as claimed in claim 1, wherein said balloon-like element includes a longitudinal axis, said method further comprising the steps of drawing said at least one wire from a supply, and winding said at least one wire around the first and second ends of the balloon-like dement while rotating the balloon-like element on its longitudinal axis.

3. The method as claimed in claim 1, wherein said adhering step includes spraying a layer of adhesive over the outer surface of the balloon-like dement and said at least one wire, to adhere said at least one wire to the outer surface of the balloon-like element.

4. The method as claimed in claim 1, wherein said placing and adhering steps are performed by simultaneously spraying said at least one wire and an adhesive onto the outer surface of the balloon-like dement.

5. The method as claimed in claim 4, further comprising spinning said at least one wire from loose fibers.

6. The method as claimed in claim 1, further comprising coating the outer surface of said balloon-like element with an adhesive material prior to said placing step.

7. The method as claimed in claim 1, wherein said placing step comprises placing a single wire having a low elasticity from the first end of the balloon-like element to the second end of the balloon-like dement.

8. The method as claimed in claim 7, wherein said placing step includes placing said single wire from the first end of the balloon-like element to the second end of the balloon-like element a plurality of times.

9. The method as claimed in claim 1, wherein said balloon-like dement includes a longitudinal axis, said placing step includes simultaneously placing a plurality of spaced wires on said outer surface of the balloon-like element in an annular configuration spaced from said longitudinal axis.

10. The method as claimed in claim 8, said locating step further comprising the steps of centering a ring around the balloon-like element having a plurality of guiding holes located in an annular configuration, moving the inflated balloon-like dement with respect to the ring, and guiding each wire along said outer surface of the balloon-like element by a respective guiding hole on the ring.

11. An inflatable closing plug for creating the seal with the interior of pipes, said plug comprising:
    an inflatable unitary balloon-like element, said balloon-like element including an outer surface and first and second ends, said balloon-like element being comprised of an elastic material having a coefficient of elasticity; and
    at least one wire located on and adhered to the outer surface of the balloon-like element, said at least one wire extending from the first end of the balloon-like dement to the second end of the balloon-like element, said at least one wire having a coefficient of elasticity from the first end of the balloon-like element to the second end of the balloon-like element;
    wherein said coefficient of elasticity of said at least one wire is lower than said coefficient of elasticity of the elastic material of the balloon-like dement.

12. The plug as claimed in claim 11, wherein said at least one wire is comprised of a material including metal.

13. The plug as claimed in claim 14, wherein said at least one wire is comprised of a fiber material.

14. The plug as claimed in claim 13, wherein said at least one wire is comprised of a glass fiber material or a carbon fiber material.

15. The plug as claimed in claim 11, wherein the balloon-like element includes first and second outer extremities, said plug further comprising a first and second fitting elements and a guiding shaft, said guiding shaft includes first and second portions telescopically movable with respect to each other, each said fitting element being attached one of the guiding shaft portions and one of the outer extremities of the balloon-like element, enabling the outer extremities of the balloon-like element to telescopically move with respect to each other.

16. The plug as claimed in claim 15, further comprising a spring means for biasing the fitting elements away from each other.

17. The plug as claimed in claim 16, wherein the spring means includes a plurality of spring strips extending between the fitting elements.

18. The plug as claimed in claim 16, wherein the spring means includes a helical spring located within the guiding shaft.

19. The plug as claimed in claim 11, wherein said at least one wire is a single wire extending a plurality of times between said first and second ends of the balloon-like element.

20. The plug as claimed in claim 11, wherein said balloon-like element includes a longitudinal axis, and said at least one guide wire includes a plurality of wires arranged in an annular configuration radially spaced from said longitudinal axis.

\* \* \* \* \*